Feb. 6, 1973  C. A. LEE ET AL  3,715,255
METHOD OF AND APPARATUS FOR BIAS LAYING WITH FLAT MANDREL
Filed Dec. 7, 1970  5 Sheets-Sheet 1

INVENTORS
Charles A. Lee
Warren R. Furbeck

ATTYS.

INVENTORS
Charles A. Lee
Warren R. Furbeck

ATTYS.

United States Patent Office 3,715,255
Patented Feb. 6, 1973

3,715,255
METHOD OF AND APPARATUS FOR BIAS LAYING WITH FLAT MANDREL
Charles A. Lee and Warren R. Furbeck, Knoxville, Tenn., assignors to International Paper Company, New York, N.Y.
Continuation-in-part of application Ser. No. 719,986, Apr. 9, 1968. This application Dec. 7, 1970, Ser. No. 95,756
Int. Cl. B65b 17/18
U.S. Cl. 156—189                    15 Claims

ABSTRACT OF THE DISCLOSURE

At least one web of material is spirally wound on a flat mandrel to form a tube which is transferred by means across a gap to a nip of a pair of flattening rolls. More specifically, the transfer means includes a pair of transfer belts which engage the external edges of the tube and hold the same against sagging or wracking and keep these edges moving at the same rate of travel across the gap as the tube travels on the mandrel.

---

This invention relates to a method of and an apparatus for producing a continuous flat multi-ply product by spirally winding at least one web of material into a hollow tube and then flattening the tube to form a ribbon-like product having superimposed, bias laid plies.

This application is a continuation-in-part of our earlier application Ser. No. 719,986, filed Apr. 9, 1968, now U.S. Pat. No. 3,580,784, and which is assigned to the assignee of this invention.

The present invention is particularly useful with webs of fine lightweight filaments which tend to sag if unsupported and which have little cross web strength as well as with creped tissue or the like which has reinforcing filaments adhered thereto which lack sufficient stretchability and recovery. However, the present invention is not limited to such webs since conventional creped tissue or other materials which have good stretchability and integrity may also be expeditiously formed into a bias laid product with the apparatus and method of this invention.

Accordingly, a general object of the present invention is to provide an improved method and apparatus for forming bias laid products of the foregoing type from web materials of various kinds.

Other objects and advantages of the invention will become apparent from the accompanying detailed description taken in connection with the drawings in which.

As shown in the drawings for purposes of illustration, the invention is embodied in a method of and an apparatus 10 for helically winding one or more webs 11 on a thin flat mandrel 12 to form a thin flat, tubular web configuration hereinafter referred to as tube 13. The helically wound tube 13 is carried longitudinally of the mandrel 12 by mandrel belts 14 to a nip of a pair of pressure rolls 15 at which the tube is flattened to form a multi-ply ribbon product 17. The web or webs 11 helically wrapped about the mandrel 12 by means of a rotatable carrier 19 which turns about an axis 22 which this helical wrapping operation, a first portion of a given web 11 engages a first one of the mandrel belts 14 which immediately begins to carry this first portion downwardly as additional web being fed from the carrier is being carried thereby and swung in an arc about the mandrel, while spaced therefrom for about 180° of travel, at which time the carrier brings the web into engagement with the other mandrel belt 14 at a position which is upwardly of the previously engaged web portion on the other belt.

Figure 1:
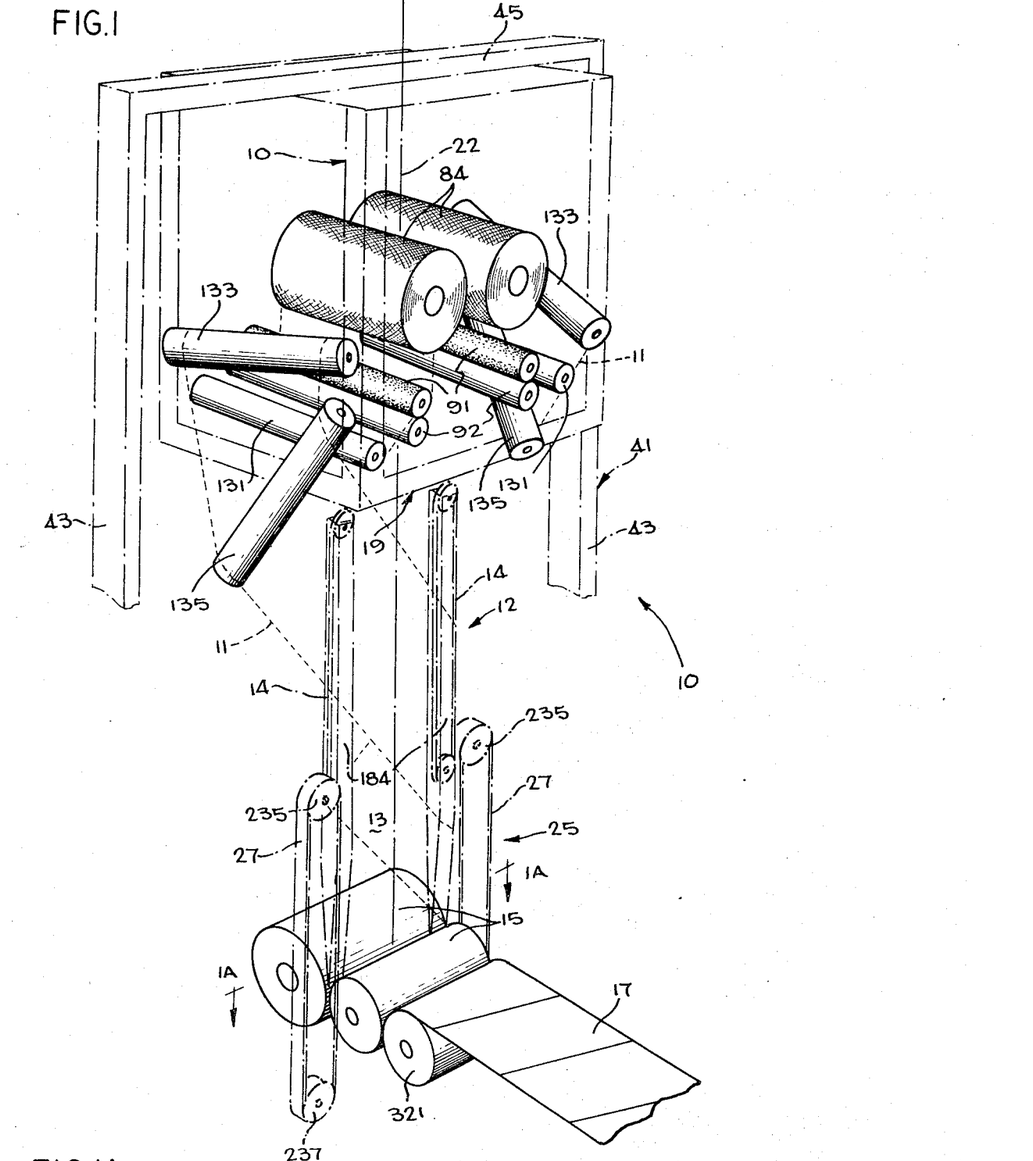
FIG. 1 is a diagrammatic view of an apparatus embodying the novel features of the invention and for carrying out the method of the invention.
Figure 1A:
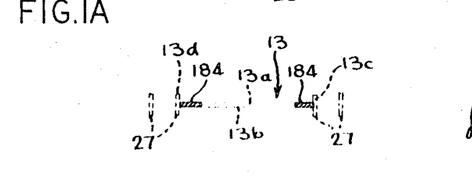
FIG. 1A is a sectional view taken substantially along the line 1A—1A of FIG. 1.

The belts 14 and mandrel 12 are preferably narrow in cross section, as best seen in FIG. 1A, so that the flattened tube on the mandrel is formed with long flat sides 13a and 13b and short, curved ends 13c and 13d joining the flattened sides with the result that the tube 13 is, as initially formed, relatively close to the flattened ribbon product 17.

Also in accordance with one aspect of the invention, the helically wound tube 13 is supported as it is transferred across a gap between the lower end of mandrel 12 and the pressure rolls 15 by a transfer means 25 in the form of transfer belts 27 which hold the outer edges of the tube and keep it moving at the same rate as when it was on the mandrel. The transfer belts 27 are preferably aligned with and travel at the same speed as the mandrel belts 14 and initially engage the external edges of the tube opposite the mandrel belts 14 with these edges gripped therebetween. Thus, the transfer means exerts downward transporting forces on the edges of the tube while the pressure rolls 15 are pulling the tube downwardly. As will be explained in greater detail, the speed of the transfer belts 27 and the pressure exerted on the tube edges may be closely controlled and finely adjusted while the tube is traveling. In this manner, the transfer of a fine gossamer like web across the gap from the mandrel to the rolls 15 has been accomplished without wracking or wrinkling of the ribbon product 17.

Referring now in greater detail to the preferred embodiment of the invention, there is provided a supporting structure or frame 41 which may take many shapes and in this instance includes a plurality of upstanding support columns 43 which are connected in a suitable manner by cross beams 45 to form a box like framework. As in the aforesaid application, the rotatable carrier 19 and attached mandrel 12 are disposed and aligned vertically on the vertical axis 22 to reduce gyroscopic forces and to assure that gravity forces assist in moving the web through the apparatus. The carrier 19 is supported for rotation about the axis 22 by a depending stationary support shaft 47 (FIG. 2) which is suitably supported by the overhead beam 45 of the framework and centered on the axis 22. As in the aforesaid application, the rotatable carrier 19 is journaled for rotation about the vertical support shaft 47 by a surrounding bearing 57 which is suitably carried by and fastened to a beam 59 of a carrier framework 60. The outer portion of the bearing 57 encircles the stationary support shaft 47 which projects through the bearing and supports the weight of the carrier 19.

Figure 2:
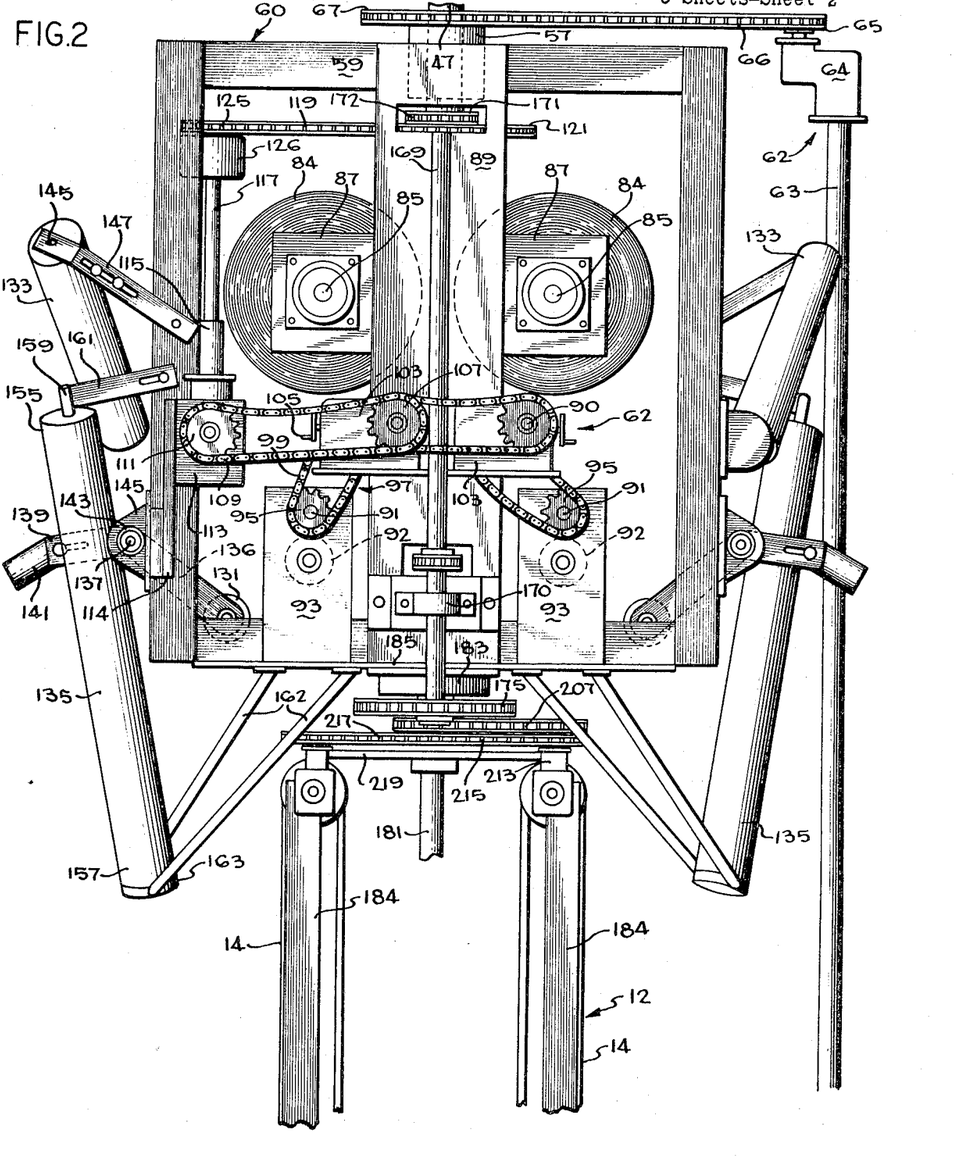
FIG. 2 is an enlarged fragmentary view of a rotatable carrier portion of the apparatus of FIG. 1.

The torque for turning the carrier 19 and for causing the unwinding of the webs 11 and the wrapping of the webs on the mandrel is obtained from a drive means 62, as best seen in FIG. 2, which includes an upstanding drive shaft 63 which at its upper end is connected to gear unit 64 having an output sprocket 65 to drive a chain 66 extending to a sprocket 67 fastened to the portion of the bearing 57 carried by and secured to the carrier framework 60. The vertical drive shaft 63 is driven by and extends to a floor mounted, gear unit 77 having a sheave 78 driven by a belt 79 extending to an output sheave 81 of a driving motor 83. Thus, the driving motor 83 acts through the gear unit 77 to rotate the shaft 63 and turn the chain 66 to turn the sprocket 67 and the carrier 19 about the vertical axis 22.

Either one or two separate supply rolls 84 of web may be carried by the carrier 19 and, in this instance, the carrier is disclosed as supporting two rolls 84 which operate in a substantially same manner. More specifically, each of the supply rolls 84 is journaled on a cantilever support shaft 85 for rotation about a generally horizontal axis through the support shaft 85 which is attached to a bracket 87 fixed to an upstanding plate 89 of the carrier framework 60. Each of the roll supporting shafts 85 is spaced equidistantly from the axis 22 through the mandrel 12 and carrier 19 about which the carrier rotates. It is preferred to provide a conventional, quick connect and disconnect mechanism for each roll on each support shaft to facilitate changing rolls. Also, the carrier framework 60 has an open side at the free ends of the support shafts 85 to facilitate insertion and removal of rolls from the support shafts.

During formation of the helically wrapped tube 13, the webs 11 are stripped from the rolls 84 at substantially constant linear speeds so that the tube on the mandrel is being formed in a continuous and substantially constant manner even though the diameter of each roll is decreasing with unwinding of the web therefrom. It is preferred to provide a driving nip for stripping the web 11 from the roll. As each web 11 is stripped in the same manner, only the feed of a single web 11 will be described in detail, it being understood that the other web is fed simultaneously and in the same manner. As best seen in FIGS. 1 and 2, the web 11 is stripped from the roll 84 by a nip between a rough surfaced feed roll 91 and a smooth surfaced lower feed roll 92 mounted in brackets 93 on the carrier 19. The feed rolls 91 and 92 extend the width of the web and are journaled by bearings in the brackets to rotate about parallel, horizontal axes. The roll 91 is driven at a speed correlated with the speed of carrier rotation and feeds the web at a constant velocity once the carrier has achieved a constant rate of rotation. As best seen in FIG. 2, one end of the roughened feed roll carries a sprocket 95 which is driven by a drive means or mechanism 97.

The preferred drive mechanism 97 for the feed rolls 91 and 92 includes a chain 99 which extends upwardly from the sprocket 95 to an output sprocket (not shown) of a speed control unit 103 which is a gear drive unit having a control handle 105 for adjusting an input to output speed ratio between its input sprocket 107 and the output sprocket driving the chain 99. Thus, the speed of the chain 99 and rolls 91 and 92 may be adjusted by turning the handle 105 of the speed control unit 103. The input sprocket 107 for the speed control unit 103 is in turn driven by a chain 109 which extends to a sprocket 111 of a right angle gear unit 113 fixed by a bracket 114 to the carrier framework 60. The right angle gear unit 113 has an upstanding input end 115 which is attached to a vertical upstanding shaft 117 which is an orbital shaft in that it is carried by the carrier for orbital movement about the axis 22 of rotation through the center of the carrier 19.

The upstanding orbital shaft 117 rotates at a speed which is proportional to the speed of the carrier rotation inasmuch as the orbital shaft 117 is carried by the carrier 19 and is driven by means of a chain 119 extending between a fixed sprocket 121 fastened to the lower end of the vertical, stationary shaft 47 which supports the carrier 19 for rotation within the overhead support frame. The chain 119 extends from this stationary sprocket 121 to a sprocket 125 of a gear unit 126 which is fastened to the upper end of the orbital shaft 117. Thus, as the carrier 19 rotates, the chain 119 moves about the fixed non-rotating sprocket 121 and as the chain moves it drives the rotatable sprocket 125 to turn the orbital shaft 117. During start-up or slowdown of the carrier rotation, the orbital shaft 117 changes its speed with the carrier speed and therefore the web 11 will be driven at speeds corresponding thereto.

To provide a more uniform tension on the web 11, the web extends from the feeding nip of the feed rolls 91 and 92 forwardly to and travels beneath a dancer rollers 131 which is pivotally mounted to pivot downwardly to take up slack in the web and to pivot upwardly in response to increased tension in the web. From the dancer roller 131 the material is threaded about an upper cylindrically shaped guide bar 133 and then downwardly to an inclined outer cylindrically shaped guide bar 135 from which the web discharges to the mandrel 12. The dancer roller 131 is carried by and journaled for rotation on an axis through the opposite ends of a pair of upwardly extending bracket arms 136 which are fixed to a rock shaft 137. The rock shaft 137 is journaled for turning about a horizontal axis through a pair of bearings 143 carried by brackets 145 fastened to the carrier. Fastened to the rock shaft 137 and extending outwardly therefrom are a pair of counterweight arms 139 on which are carried counterweights 141 which reduce the force of the weight of the dancer roll 131 on the web 11. As the web becomes more slack, the dancer roller 131 is free to pivot down and turn the rock shaft 137 to lift the counterweights 141 thereby maintaining the web with a predetermined tension therein. Conversely, when the web 11 becomes more taut, the counterweights 141 will pivot down and the dancer roller 131 will pivot up to release some of the web and reduce a loop formed in the web whereby the web tension is maintained nearly uniform The web 11 is guided from a general horizontal position to an on edge position in a vertical plane by a suitable means in the form of the guide bars 133 and 135. The guide bars are also positioned so that a line extending across the web and perpendicular to the edges of the web remains normal thereto and travels substantially the same path lengths throughout its travel. More specifically, the linear speeds and travel distances for the respective different portions of the web 11 are equalized to prevent a twisting or wrinkling of the web as it is changed in its substantially horizontal orientation on the carrier 19 to its substantially vertical, on-edge orientation when applied to the mandrel 12.

The web 11 tracks on the guide bar 133, which is fixedly mounted on a supporting shaft 145 which is carried at its ends in suitable bracket arms 147 attached to the carrier. The web travels about the outside surface of the bar 133 and therefrom the web extends to the outer side of the bar 135 which has its upper end 155 spaced outwardly from the carrier relative to its lower end 157. The guide bar 135 is fixedly mounted on a shaft 159 fastened at its upper end to an upper bracket arm 161 extending to the carrier frame. The web 11 tracks better on fixer bars 133 and 135 than it does if the bars were allowed to rotate as rollers. A pair of lower bracket struts 162 extend from the bottom of the carrier to the lower end of the bar 135. Preferably the path about the bars 133 and 135 results in the parallel filaments moving along substantially parallel paths through equal distances and at relatively constant velocity so that the web is applied to the mandrel 12 without being stretched or twisted or wrinkled across its entirety. The angle of the guide bar 135 also determines the helix angle at which the web is applied to the mandrel 12 and hence the bias angle the plies are to have in the final ribbon product 17.

Usually the angle of inclination or helix angle ranges between 15–45 degrees although the helix angle may be varied from this range. For angle changes of only several degrees, only the bar 135 is shifted, but for larger variations in angles, the guide bar 133 may also be shifted to bring the web 11 into position at the desired helix angle.

In the preferred embodiment of the invention, the mandrel 12 is supported directly by and depends from the rotating carrier 19, but unlike the carrier, the mandrel 12 remains stationary relative to the pressure rollers 15 which flatten the tube and toward which the lower end of the mandrel is extended. To assure that the mandrel remains stationary and does not rotate with the carrier which supports the same, the mandrel is driven in the reverse direction at an identical angular speed to the angular speed of rotation for the carrier. For example, if the carrier 19 is rotated at 50 r.p.m. in the counterclockwise direction, the mandrel 12 is driven in the clockwise direction at 50 r.p.m.

To couple the mandrel speed to the carrier speed, particularly during the start up and slow down of the carrier rotation, the mandrel 12 is driven directly from and as a result of the carrier 19 rotation. To this end, the carrier 19 is provided with a mandrel drive shaft 169 (FIG. 2) which is mounted on the carrier in a vertical position for rotation within bearing brackets 170. The mandrel drive shaft 169 is an orbital shaft with its axis offset from the rotational axis 22 of the carrier. On the upper end of the mandrel drive shaft 169 there is affixed a sprocket 171 about which is trained a chain 172 which has an opposite end trained about a stationary gear (not shown) fixed by bolts to the lower end of the stationary support shaft 47 immediately adjacent the fixed sprocket 121 for the chain 119 which drives the orbital shaft 117. In a manner similar to that described for the chain 119, rotation of the carrier causes orbital movement of the shaft 169 with the chain 172 turning the sprocket 171 and shaft 169. The shaft 169 thus rotates in a speed proportional to the rotational speed of the carrier.

Figure 3:
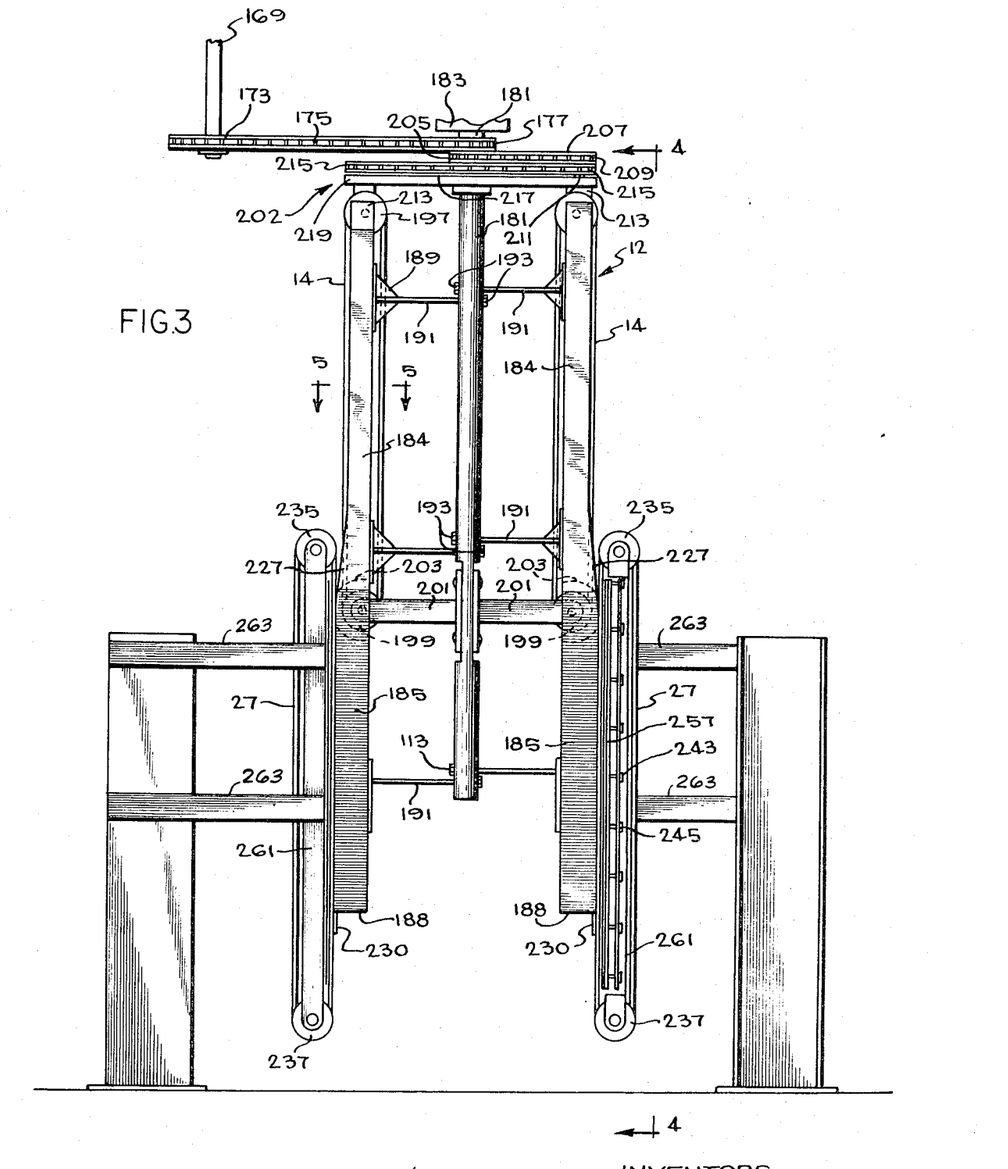
FIG. 3 is an enlarged fragmentary view of the mandrel of the apparatus of FIG. 1.

To drive the mandrel 12, the lower end of the orbital shaft 169 carries a sprocket 173, as best seen in FIG. 3, for driving a chain 175 which is trained about a sprocket 177 fixed to a mandrel driving and support shaft 181 which is journaled for rotation in a bearing 183 fixed to the underside of a bottom stationary plate 185 for the carrier 19. The longitudinal axis of the mandrel support shaft 181 is aligned with the vertical axis 22. In summary, as the carrier rotates and orbits the orbital shaft 169 about the axis, the fixed gear and chain 172 cause the shaft 169 to rotate (as it orbits) and to drive the chain 175 to rotate the mandrel support shaft 181 and thereby the mandrel in the reverse direction at the same rotational speed the carrier 19 moves in the forward direction.

Figures 4, 5, 6, 7:
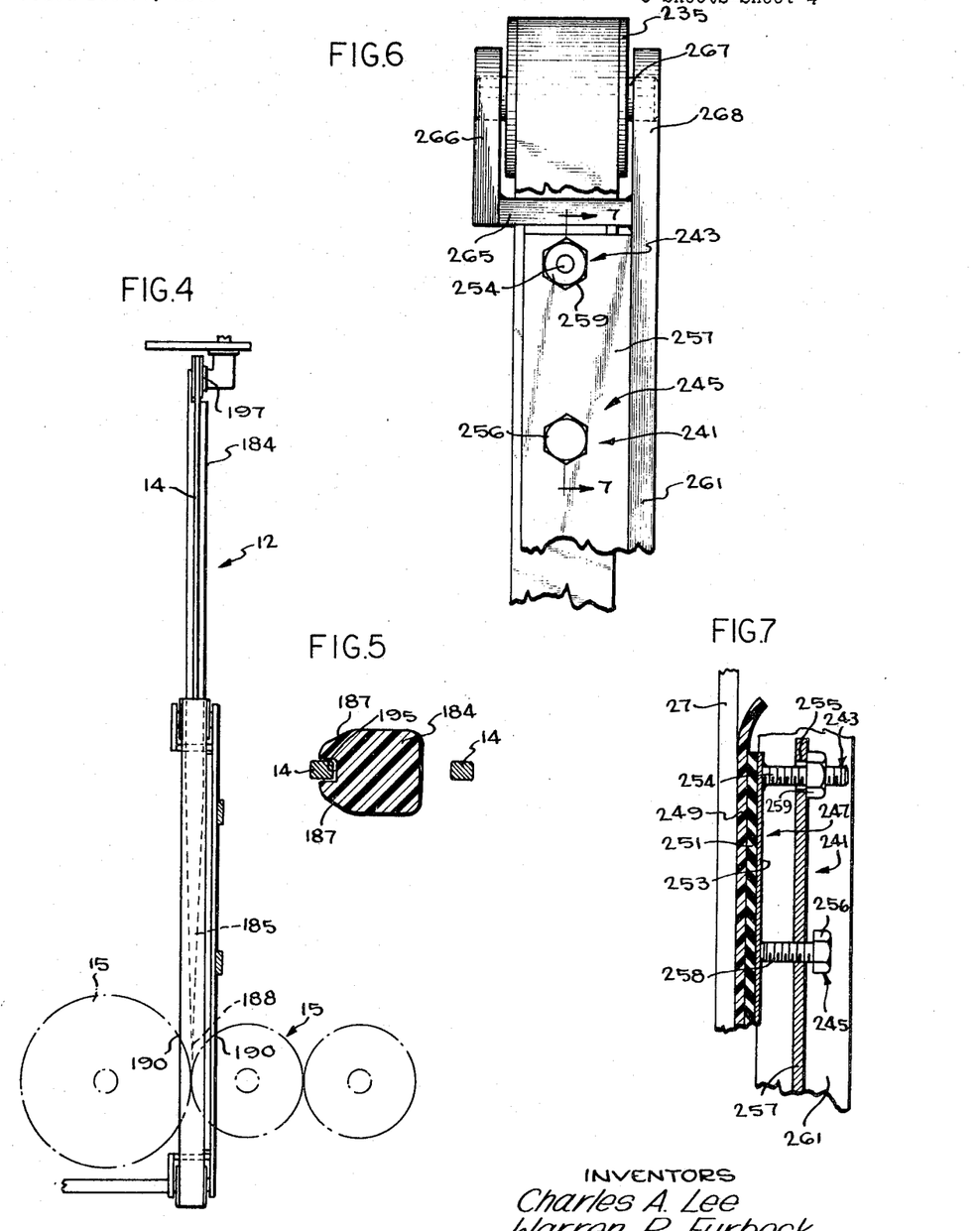
FIG. 4 is a side view of the mandrel of FIG. 3 taken along line 4—4 thereof.
FIG. 5 is an enlarged cross sectional view taken substantially on the line 5—5 of FIG. 3.
FIG. 6 is an enlarged fragmentary view of a roller and support for a transfer belt.
FIG. 7 is a cross sectional view taken along the line 7—7 of FIG. 6.

In accordance with one aspect of the present invention, the thin flat mandrel 12 is formed with the two flat narrow bars 184 which engage the web tube at small curved areas 187 (FIG. 5) on either side of its mandrel belt 14. As will be appreciated from the illustrations, the web frictionally engages and is carried on only a very small area on the mandrel bars 184, more specifically, four similar curved surfaces 187 on opposite sides of the respective mandrel belts 14. As best seen in FIG. 4, the lower ends of the mandrel bars 184 are tapered along surfaces 185 and provide a decreasing cross sectional thickness to their lower ends 188 which are pointed to project as close as possible to the nip formed by converging curved walls 190 (FIG. 4) of the pressure rollers 15 which define a throat leading into the nip between the rollers 15. Preferably, the mandrel bars 184 are formed of a plastic material which has a low sliding coefficient of friction so that the material slides readily down the bars as it is being carried downwardly by the belts.

As best seen in FIG. 3, the mandrel bars 184 are provided with inwardly facing brackets 189 to which are fastened one end of a pair of inwardly projecting support rods 191 fastened to the center support mandrel shaft 181. Nuts 193 are threaded on the ends of the rods 191 to hold the rods, which project through openings in the shaft 181, in parallel and adjusted positions for the desired width of tube to be formed. By loosening the nuts 193, the rods 191 may be positioned inwardly or outwardly from the support shaft 181 to construct different width tubes, and thereby eventually different widths of flattened multi-ply product 17. The mandrel bars may also be adjusted to be vertical and parallel to one another throughout their length.

The mandrel belts 14 on which the web is wrapped in a helical manner are preferably guided by having their inner facing portions seated within tracks 195 (FIG. 5) formed in the outer faces of the plastic mandrel bars 184. The belts 14 are trained about an upper sheave 197 at the upper end of the mandrel bars 184 and a lower sheave 199 (FIG. 3) and journaled on a horizontal axle carried by a pair of bracket arms 201 extending to and fastened to the mandrel support shaft 181. Each of the lower sheaves 199 is disposed in a slotted opening 203 in the mandrel bar 184 through which its belt may pass from the outer side of the mandrel bar 184 to the inner side of the mandrel bar.

To assure that the speed of mandrel belts 14 corresponds to the speed of tube travel and is correlated with the web speed particularly as the web speed increases or decreases during start-up and shutdown operations, a suitable drive 202 from the orbital shaft 169 is obtained. The orbital shaft 169, as best seen in FIG. 3, drives the mandrel support shaft 181 through the chain 175. This mandrel support shaft 181 has fixed thereon a sprocket 205 with a chain 207 extending from the latter to a sprocket 209 fastened to a shaft 211 which is upstanding from a right angled gear unit 213. Carried on the shaft 211 is a second and lower sprocket 215 about which is trained a chain 217 extending across to the other right angle drive unit 213 and a similar sprocket 215 thereon so that each of the respective mandrel belts 14 is driven at the identical speed. The right angle gear units 213 are fastened to a horizontal, flat upper bar 219 supported by the support shaft 181.

The generally flattened tube 13 is supported and guided during its movement from the mandrel 12 into the nip of the counter rotating pressure rollers 15. As explained above, the lower ends of the respective mandrel bars 184 are tapered to the tips 188 and simultaneously the outer lower edges of the bars flared outwardly along edges 227 (FIG. 3) to provide a greater width for the tube sides 13a and 13b and reduce the space between these tube sides. Preferably, the circumferential dimension of the tube 13 remains substantially constant as the tube 13 becomes flatter and wider.

As best seen in FIG. 3, a small spur or projection 230 is formed on the lower ends of the mandrel bars 184 outwardly of the positions of the pressure rollers 15 to extend slightly below the nip of the pressure rollers 15. Thus, the outer edges of the tubes 13 may be held in a grip between the transfer belts 27 and the projections 230 while the remainder of the tube is being flattened in the nip of the pressure rolls 15. In this way, the tube 13 is held, gripped and transferred without being released thereby preventing wrinkling due to the outer edges of the web moving relative to the central portion of the tube being drawn into the nip between counter rotating rollers 15.

Referring now more specifically to the transfer belts 27 which engage the outer sides of the tube on the mandrel bars 184, the transfer belts 27 move downwardly, as best seen in FIGS. 3 and 4, along a path from an upper roller 235 to a lower roller 237 which is located at a position that is lower than the nip of the pressure rollers 15. As will be explained, the speed of the transfer belts 27 may be closely adjusted; and additionally, the pressure contact between the transfer belt and the material may be adjusted so that the edges of the tube are gripped and traveling without movement relative to the center portions of the flattened tube which are being pulled downwardly by the counter rotating nip rollers 15. By having such adjustable controls, the operator of the apparatus may make adjustments to increased or decreased pressure and/or speed and observe the results of his adjustments in respect to eliminating wrinkles in the final product.

For the purpose of assuring a proper gripping pressure on the tube edges 13c and 13d by the transfer belts 27, the latter may be moved inwardly or outwardly toward the mandrel bars 184 by an adjustable backup means 241. In this instance, the backup means 241 includes, as best seen in FIGS. 6 and 7, pull screws 243 and push screws 245 which operate against a composite back plate 247 which has a plastic sheet or layer 249 for engaging the transfer belt. A rubber sheet or cushion 251 is laminated to the opposite side of the plastic sheet 249 and a steel sheet or layer 253 is laminated to the rubber layer 251. The respective push and pull screws act on the metal layer 253 and the forces applied thereto are transferred and distributed more uniformly across a large area on the plastic layer 249 by the intermediate rubber layer. The upper and lower ends of the plastic layer 249 are flared outwardly from its associated transfer belt 27 to prevent snagging of the belt thereon. The preferred form of pull screw 243 includes a horizontally disposed threaded stud 254 welded at an inner end to the sheet metal layer 253 and projecting normal thereto and through a slot 255 in the vertical stationary frame member 257. A nut 259 is threaded on the free end of stud 254 and abuts the outwardly facing side of the stationary member 257 and by turning the nut the stud may be shifted relative to the stationary member. The push screws 245 have a head 256 and a threaded shank 258 which is threaded in the frame 157. The opposite end of the shank 258 rests against and abuts the sheet metal layer 253 of the backup plate. By turning the push screw, the pressure of the backup plate can be increased or decreased to vary the bowing or deflecting of the backup plate at localized areas.

The stationary plate 257 of the backup means 241 projects into the space between the downward and upper returning runs of the transfer belt 27 with the push pull screws 243 and 245 being accessible for turning in space between these belt runs. This stationary member 257 is fastened along one vertical edge thereof, the right hand edge when viewed as in FIG. 6, to a vertical supporting plate 261 which in turn is fastened through several horizontally disposed bars 263 (FIG. 3) to the main support framework of the apparatus. The vertical plate 261 extends from the upper pulley 235 to the lower pulley 237 which is located below the axis of the nip rollers and fastened on each end thereof is an angle shaped bracket 265 which cooperates with the plate 261 to form a yoke or spaced apart arms 266 and 268 for supporting an axle 267 on which are journaled the rollers 235 and 237. In this manner, the transfer belts 27 are supported and positioned with proper contact pressure from first engagement with the tube 13 at the upper mandrel belts 14 until releasing the edges thereof below the nip of the counter rotating pressure rollers 15.

Figures 8, 9:
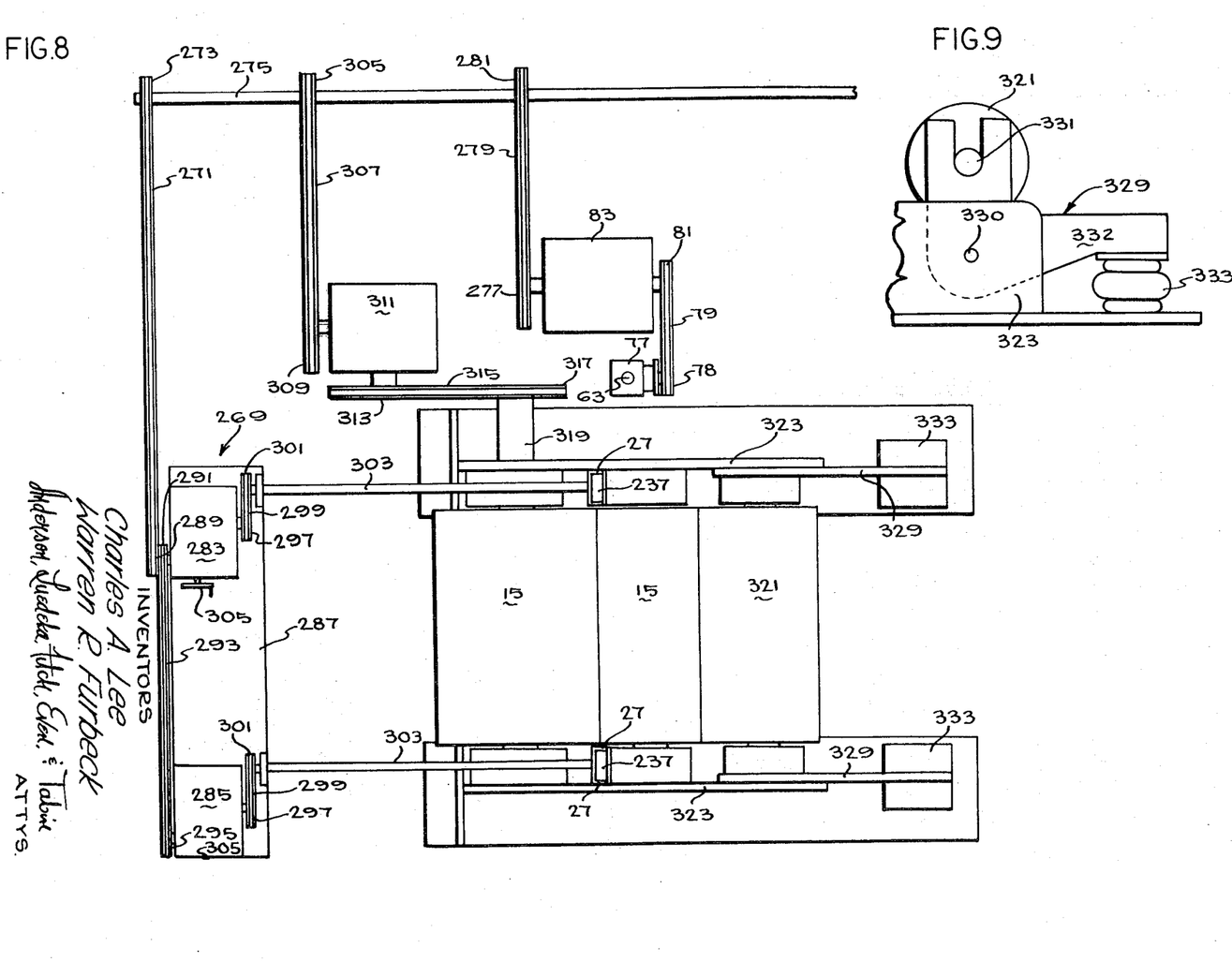
FIG. 8 is a plan view of a motor drive for the apparatus of FIG. 1.
FIG. 9 is a fragmentary elevational view of a mounting of a pressure roller.

As previously stated, the respective transfer belts 27 are preferably driven at the same speed and as the upper mandrel belts 14 and also have their speeds correlated to the rotational speed of the carrier 19. Additionally, it is preferable to provide fine speed adjustment for each of the transfer belts 27 so that the same may be finely adjusted if necessary relative to one another to maintain the web's helical angle against wracking during the transfer of the tube 13 into the nip of the pressure rollers 15. To these ends, transfer belts 27 are driven, as best seen in FIG. 8, by a drive means 269 which includes an input chain 271 which is driven by a drive sprocket 273 fixed to a line shaft 275 which is driven by the motor 83 above described as providing the drive for the carrier. The motor 83 drives the line shaft 275 by means of an output sprocket 277 which drives a chain 279 to turn sprocket 281 fixed to the line shaft 275. Thus, during start-up or slowdown of the carrier 19 due to starting or stopping of the motor 83, the drive means 269 will be correspondingly varied in speed because of its drive connections to the motor 83.

The preferred manner of being able to vary and adjust the speed of one transfer belt 27 relative to the other transfer belt 27 and independently relative to the speed of the line shaft 275 is through variable speed devices in the form of speed control units 283 and 285 which are mounted on a common support plate 287. The unit 283 has an input sprocket 289 driven by the chain 271 and an adjacent sprocket 291 drives a chain 293 extending to a sprocket 295 for driving the other unit 285. Each of the units 283 and 285 has an output drive sprocket 297 for driving a chain 299 extending to a sprocket 301 of a drive shaft 303 which extends to a lower drive roller 237 for a transfer belt 27. The speed of the respective transfer belts 27 may be varied upon turning a crank handle 305 for a given unit 283 or 285 which results in a change of the gear ratio between its inlet sprocket and its outlet sprocket 297.

The pressure rollers 15 for collapsing the tube are also driven in timed relationship to the speed of the other parts of the apparatus including the carrier 19 and the transfer belts 27 by having a drive which is also connected to the line shaft 275. More specifically, a sprocket 305 is fixed to the line shaft 275 and drives a chain 307 which extends to an input sprocket 309 of a right angle gear unitl 311 having an output sprocket 313 driving a chain 315 extending to a sprocket 317 fixed to a drive shaft 319 of the larger one of the pressure rollers 15, which may be chrome plated. In this instance, the smaller pressure roller is a compression roller having a rubber or elastomeric surface thereon which is frictionally driven by the larger nip roller 15 and the latter in turn drives another roller 321 from which the ribbon product 17 discharges for travel to a winder (not shown).

In this illustrated embodiment of the invention, the pressure rollers 15 are journaled on suitable axes in an upstanding support stand 323. The path for the helically wrapped tube is into the nip between the rubber and chrome plated pressure rollers 15 and then about the lower surface of the smaller pressure rollers and into another nip formed with roller 321 which is also rubber cushioned. The roller 321 is pivotally mounted to bear against the smaller pressure roller 15 by means including a pair of bell crank shaped levers 329 (FIGS. 8 and 9) in which an axle 331 for the roller 321 is journaled. The levers 329 are pivotally mounted on pivot pins 330 carried by the sand 323 and have horizontal arms 332 positioned upon inflatable pads 333 which may be expanded or contracted to vary the amount of force being applied at the nips between the respective nip rollers 15 and also between the smaller nip roller 15 and the roller 321. From the roller 321, the now flattened bias laid ribbon product 17 is carried by an endless carrier belt (not shown) to the winder which winds the same into a roll.

A typical operation of the apparatus will now be described as an aid to understanding the invention. A pair of supply rolls 84 of the web material, such as webs of generally parallel filaments oriented in a longitudinal dimension and superfically bonded together in the transverse direction, are inserted into the rotatable carrier and mounted on the respective supporting spindles 85. The longitudinal axis of the respective supply rolls 84 are substantially horizontal and perpendicular to the vertical axis 22 through the mandrel 12. The respective axis of the supply rolls 84 are disposed as close as possible to the spinning axis 22 to reduce the amount of inertia force being generated. Each of the leading ends of the respective webs 11 from the respective rolls are threaded through the nip of feed rollers 91 and 92 on the carrier and then under the dancer roller 131 and then along the top surface of an upper guide bar 133 and about the outer surface of the downwardly extending guide bar 135 from which the web extends to the mandrel 12 at which the webs 11 are vertically oriented. Each of the webs 11 extends to the mandrel 12 at an angle to a true horizontal plane, this angle being termed the helix angle for the tube to be formed. This helix angle may be varied but is usually within the range of 15° to 45° and determines the bias angle of the filaments relative to the longitudinal direction of the flattened driven product 17 formed after passing through the nip of pressure rollers 15.

While on the mandrel 12, the longitudinally extending edges of the webs may be abutted or slightly overlapped after winding about the mandrel belts 14. When threading new webs, the leading ends of each web are inserted through the nip of the pressure rollers 15 and then connected to the winder.

With the respective webs 11 properly threaded through the apparatus, the drive motor 83 is started and begins rotation of the carrier 19 which rotates in one direction while the orbital drive shaft 169 rotates the mandrel 12 in a direction opposite to the rotation of the carrier but at the same angular speed as the carrier speed. Therefore, the mandrel 12 which is supported on the carrier remains stationary relative to the ressure rolls 15. The orbital shaft 117 drives the feed rollers 91 and 92 to strip the webs from the parent rolls 84 at the desired speed. Once up to operational speed, the feed rolls 91 and 92 feed the webs 11 at a given, constant speed even though the diameter of the parent rolls 84 is becoming smaller with unwinding of the webs from the rolls.

The common motor 83 and line shaft 275 drive the transfer belts 27 and the nip rollers 15 in timed relationship to the carrier rotation. By adjusting the speed control units 283 and 285 (FIG. 8), the speed of the transfer belts 27 may be precisely controlled relative to each other and to the speed of the mandrel belts 14 to assure that the helically wound tube 13 travels across the gap from the tips 188 of the mandrel bars 184 to the nip of the pressure rolls 15 without wracking or wrinkling the final ribbon product 17.

It will be seen from the foregoing that the web guide bars 135 travel in a circular path about the axis 22 and that the webs 11 are thus being discharged from the carrier while also traveling in a circular path. It is only during approximately a few degrees of travel at two diametrically opposite positions that the webs 11 abut the mandrel belts 14 and the mandrel bars. At other positions of travel, the bars 135 are discharging the webs and holding the same outwardly while the webs extend therefrom to its last engaged belt 14 to form lengths of web which are continually increasing in extent. However, while the webs 11 are increasing the extent of their lengths from the mandrel belts 14 to the web guide rollers 135, the bars 135 are carrying the point of web discharge in a 180° arc from a position close to one mandrel belt 14 outwardly to a position of maximum distance from the same mandrel belt 14 and then toward and close to the other opposite mandrel belt. The web guide bars 135 discharge the webs at a fixed height above the pressure rolls 15 but the mandrel belts 14 are carrying the other ends of the web lengths downwardly at a predetermined rate. This changing geometrical relationship is particularly noticeable when the web guide bars 135 are moving toward the mandrel belts 14 to apply one-half of a helical wrap to the respective belts on opposite sides of the mandrel at an upper position; and then begin to move away from the mandrel belts to provide new lengths for the next half wraps for the mandrel while the last mentioned wrap is simultaneously moving down the mandrel 131. The dancer roll 131 and the loop of web formed thereby provide compensation for increases or decreases in web tension due to these changing geometrical relationships and provide a substantially uniform tension and hence prevent wracking, wrinkling or tearing of the webs.

The overlapping or abutting of the longitudinally extending edges of adjacent helical wraps of the webs 11 provides a continuous tube wall which is relatively thin in cross section, wide in width, and hollow on the inside thereof. The tube 13, however undergoes a slight transition in cross section to become thinner and wider as the web travels along the lower ends of the mandrel bars 184. The transfer belts 27 hold the edges 13c and 13d of the tube 13 as the pressure rollers draw the tube into the nip therebetween.

The pressure rollers 15 may cause the plies of the bias laid product to be bonded or adhered in various manners such as by heating a heat settable adhesive on the webs or by applying sufficient heat and pressure to cause a heat sealing operation where the webs have fibers and/or filaments which will bond together with heat and pressure. As an alternative, as disclosed in the aforesaid application, plies of creped tissue may be bonded together by spaced areas of embossures either at the pressure rolls 15 or at a position downstream thereof. In the one embodiment of the invention, the webs of filamentary material are provided in a prior step with an adhesive, which when heated and subjected to pressure, will bond to an opposite ply. After forming the ribbon product 17, the edges 13c and 13d may either be retained or trimmed from the ribbon product. Also, when the ribbon product 17 is wider than needed for its ultimate use, the ribbon product 17 may be sent through a slitter to slit the same into a plurality of narrow ribbons prior to winding the same.

The method described is particularly useful with webs having very good tensile strength in the machine or longitudinal direction as compared to the tensile strength in the cross machine or transverse direction. For example, webs of tow or webs of creped tissue having longitudinal extending filaments bonded thereto have exceedingly strong tensile strengths and resist elongation in the longitudinal direction. With the method of the present invention, the webs 11 are helically wrapped on the mandrel 12 but in a manner that the webs are required to undergo very little stretching and very little transformation in cross sectional shape when traveling along the mandrel 12 and when being flattened into the multi-ply, bias laid ribbon product by the pressure rolls 15. Also, in accordance with the described method, the tube 13 is supported and carried by the transfer means across the gap between the mandrel 12 and the pressure rolls 15 in a selectively controlled manner to prevent the sagging of tube wraps or a turning and twisting of helically wraps or portions thereof as would cause wrinkles or a nonuniform flatness for the bias laid product 17.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for forming a nonwoven, bias laid, multi-ply product from at least one web comprising a carrier for a web supply roll rotatable about an axis and discharging said web therefrom an elongated mandrel for receiving said web and forming a helically wrapped tube on said mandrel and for discharging said tube at one end thereof, said mandrel being wide relative to its thickness, continuously moving belts associated with the marginal edges of said mandrel for moving said web longitudinally of said mandrel when the web is laid thereon, said continuously moving belts being spaced circumferentially relative to said path of web discharge from said carrier to engage first and second portions of said web with said first portion being carried longitudinally along said mandrel toward said one end of said mandrel while said web is being moved circumferentially about said mandrel to engage a second portion thereof with the second one of said belts, said engagement of said second portion of said web being at a position upstream from said first portion of the web, flattening means spaced by a gap from the end of said belts at said one end of said mandrel for flattening said tube for forming said multi-ply product with bias laid plies, and transfer means for engaging said helically wound tube in the region between said moving belts and said flattening means to exert a force on said tube in the direction of feed of said tube to assist in transferring said tube from the ends of said moving belts to said flattening means.

2. An apparatus in accordance with claim 1 in which said transfer means includes a pair of transfer belts, means to press said transfer belts against said tube, and means to drive said transfer belts at substantially the speed at which said tube travels on said mandrel.

3. An apparatus in accordance with claim 2 in which said carrier discharges said web in a circular path about said axis and in which said mandrel belts are spaced to engage the web after about 180° of web travel about said path, said belts having a width which is small relative to the circumferential length of said path whereby said web is spaced from said mandrel for the majority of its circumferential movement thereabout.

4. An apparatus in accordance with claim 2 in which said mandrel includes a pair of elongated, flat bars which are spaced apart and which support said endless belts for travel therealong.

5. An apparatus in accordance with claim 4 in which tracks are formed in said elongated bars for guiding said mandrel belts in the direction of tube travel on said mandrel and in which said flattening means comprises a pair of pressure rollers having a nip for flattening said tube and a throat defined therebetween leading to said nip, said elongated bars having tapered ends projecting into said throat and adjacent to said nip to support said tube to a position adjacent to said nip.

6. An apparatus in accordance with claim 5 in which said transfer means includes a pair of transfer belts for assisting in moving said tube from said narrowed ends of said bars into said nip.

7. An apparatus in accordance with claim 6 in which said transfer belts engage said tube externally thereof and opposite said mandrel belts, said mandrel belts being disposed internally of said tube, said tube being gripped between said mandrel and transfer belts and being drawn along said mandrel toward said nip.

8. An apparatus in accordance with claim 7 in which said mandrel belts are disposed above said pressure rollers and disengage from said tube and in which projections on said bars cooperate with said transfer belts to hold and carry opposite outer edges of the tube while the remainder of the tube moves into and through said nip.

9. An apparatus in accordance with claim 8 in which means are provided to urge said transfer belts against said tube with selectively adjustable pressures.

10. An apparatus for forming a non-woven, bias laid, multi-ply product from a web comprising a carrier for a web supply roll rotatable about an axis, means on said carrier for discharging said web at a fixed radial distance from said axis whereby said web is discharged along a circular path from said carrier, a mandrel having a pair of spaced supports about which said web is wrapped at first and second spaced positions during a rotation of said carrier to form a spirally wrapped tube, continuously moving belt means for engaging said web and transporting said tube along said mandrel to a free end thereof, said supports having free ends from which said helically wrapped tube is discharged, a pair of pressure rolls disposed adjacent to and spaced by a gap from said free ends of said supports and having a nip to receive said tube and to form said multi-ply, bias laid product, and transfer means for engaging said tube and exerting a force in the direction of travel of said tube across said gap from said mandrel to said nip.

11. An apparatus in accordance with claim 10 in which said transfer means comprises a pair of endless belts disposed to engage said tube externally thereof and opposite from said first belt means which is engaging said tube internally thereof.

12. An apparatus in accordance with claim 11 in which projections are formed on said supports at positions spaced outwardly of the ends of said pressure rollers and project beyond said nip in the direction of tube travel, said endless belts cooperating with said projections to feed the edges of the tube while the portion of the tube intermediate said edges is being flattened.

13. An apparatus in accordance with claim 10 in which said means for discharging said web from said carrier comprises a non-rotatable bar fixed to the carrier at an angle to the horizontal and vertical directions with the web tracking across the bar to said mandrel.

14. A method of producing a flattened, bias laid, multiply product from at least one web comprising the steps of rotating a supply roll of said web about an axis and feeding said web to a mandrel, wrapping said web on the mandrel into a helically wound tube by abutting said web on a first continuously moving mandrel surface and abutting said web on a second continuously moving mandrel surface spaced circumferentially from said first moving surface, selectively supporting said helically wound tube while transferring the same across a gap from the mandrel to a flattening means, and flattening said tube to form the multi-ply, bias laid, non-woven product.

15. A method in accordance with claim 14 in which the speed of transfer of the tube across said gap is selectively controlled and adjusted and in which the supporting force is also selectively controlled and adjusted to provide a non-woven, bias laid product.

References Cited

UNITED STATES PATENTS 3,488,242  1/1970  Berry ___________ 156—195 X
3,489,635  1/1970  Taylor ___________ 156—426

EDWARD G. WHITBY, Primary Examiner

U.S. Cl. X.R.

156—195, 425, 429, 449